US012595962B2

(12) United States Patent
Ma et al.

(10) Patent No.: US 12,595,962 B2
(45) Date of Patent: Apr. 7, 2026

(54) CATHODE MATERIAL DRYING DEVICE AND CATHODE MATERIAL DRYING PRODUCTION LINE

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Tengyue Ma, Guangdong (CN); Kuiwen Shen, Guangdong (CN); Dong Peng, Guangdong (CN); Yunguang Yang, Guangdong (CN); Changdong Li, Guangdong (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 427 days.

(21) Appl. No.: 18/371,474

(22) Filed: Sep. 22, 2023

(65) Prior Publication Data

US 2024/0011709 A1 Jan. 11, 2024

Related U.S. Application Data

(63) Continuation of application No. PCT/CN2022/095678, filed on May 27, 2022.

(30) Foreign Application Priority Data

Aug. 9, 2021 (CN) ........................ 202110908217.2

(51) Int. Cl.
*F26B 3/24* (2006.01)
*F26B 25/00* (2006.01)
(Continued)

(52) U.S. Cl.
CPC .............. *F27B 7/24* (2013.01); *F26B 25/007* (2013.01); *F27B 7/33* (2013.01)

(58) Field of Classification Search
CPC .......... F26B 17/34; F26B 23/04; F26B 25/00; F26B 25/002; F26B 25/005; F26B 3/24;
(Continued)

(56) References Cited

U.S. PATENT DOCUMENTS 5,273,355 A * 12/1993 May .......................... B09C 1/08
432/106
11,248,841 B2 * 2/2022 DeWaard .............. F26B 11/028

FOREIGN PATENT DOCUMENTS

CN 110006241 A * 7/2019 ............ F26B 25/005
CN 211204836 U * 8/2020
(Continued)

OTHER PUBLICATIONS

International Search Report of PCT Patent Application No. PCT/CN2022/095678 issued on Aug. 23, 2022.

*Primary Examiner* — Gregory A Wilson
(74) *Attorney, Agent, or Firm* — Westbridge IP LLC

(57) ABSTRACT

This application discloses a cathode material drying device and a cathode material drying production line. The cathode material drying device includes: a rotary kiln, where a kiln head and a kiln tail of the rotary kiln each are provided with a sealing structure and the rotary kiln can rotate relative to the sealing structure; and an exhaust system comprising an air inlet pipe, an air outlet pipe, and a first fan, where the air inlet pipe communicates with the kiln tail of the rotary kiln through the sealing structure; the air outlet pipe communi-
(Continued)

cates with the kiln head of the rotary kiln through the sealing structure; and the first fan is arranged on the air inlet pipe and/or the air outlet pipe, so as to make an air flow direction in the rotary kiln opposite to a delivery direction of a cathode material.

5 Claims, 2 Drawing Sheets

(51) Int. Cl.
*F27B 7/24* (2006.01)
*F27B 7/33* (2006.01)

(58) Field of Classification Search
CPC ....... F26B 11/024; F26B 11/04; F26B 11/049; F27B 7/24; F27B 7/362; F27B 7/36
See application file for complete search history.

(56) References Cited

FOREIGN PATENT DOCUMENTS

| | | | | |
|---|---|---|---|---|
| CN | 113758237 A | * | 12/2021 | ............. F27D 17/20 |
| DE | 3725513 A1 | * | 2/1989 | ................ B01J 6/00 |

* cited by examiner

CATHODE MATERIAL DRYING DEVICE AND CATHODE MATERIAL DRYING PRODUCTION LINE

CROSS REFERENCE TO RELATED APPLICATIONS

The present application is a Continuation Application of PCT Application No. PCT/CN2022/095678 filed on May 27, 2022, which claims the benefit of Chinese Patent Application No. 202110908217.2 filed on Aug. 9, 2021. All the above are hereby incorporated by reference in their entirety.

TECHNICAL FIELD

This application relates to the field of batteries, and in particular to a cathode material drying device and a cathode material drying production line.

BACKGROUND

Traditionally, an electrode material is generally fed in batches into a special drying device for drying, such as a vertical drying oven, a microwave drying oven, a double-cone dryer, and a spray drying tower. Dust, water vapor, and other emissions are generated during drying, and thus the electrode material is dried in batches to prevent leakage of the emissions.

SUMMARY

This application is intended to solve at least one of the technical problems existing in the prior art. In view of this, this application provides a cathode material drying device, which can not only prevent the leakage of emissions, but also continuously dry a cathode material with high efficiency.

This application also provides a cathode material drying production line, including the cathode material drying device.

According to an embodiment in a first aspect of this application, a cathode material drying device is provided, comprising:

- a rotary kiln, where a kiln head and a kiln tail of the rotary kiln each are provided with a sealing structure and the rotary kiln can rotate relative to the sealing structure; and
- an exhaust system comprising an air inlet pipe, an air outlet pipe, and a first fan, wherein the air inlet pipe communicates with the kiln tail of the rotary kiln through the sealing structure; the air outlet pipe communicates with the kiln head of the rotary kiln through the sealing structure; and the first fan is arranged on the air inlet pipe and/or the air outlet pipe, so as to make an air flow direction in the rotary kiln opposite to a delivery direction of a cathode material.

The cathode material drying device according to the embodiment in the first aspect of this application at least has the following technical effects:

The rotary kiln is provided to treat a cathode material. A cathode material can be continuously fed through the kiln head of the rotary kiln, dried in the rotary kiln, and then discharged out through the kiln tail. Compared with the traditional method, the cathode material drying device according to the embodiment in the first aspect of this application can continuously dry a cathode material with high efficiency. Moreover, a cathode material is constantly thrown up and falls in the rotary kiln during a drying process, such that the cathode material is always in a motion state, which can prevent the cathode material from agglomeration compared with the traditional method. A sealing structure is provided at each of the kiln head and the kiln tail of the rotary kiln to improve the air tightness of the rotary kiln.

The air inlet pipe communicates with the kiln tail of the rotary kiln, and can introduce fresh and clean compressed air and blow air to a cathode material at the kiln tail of the rotary kiln to remove residual particle dust and moisture on a surface of the cathode material, which reduces the agglomeration probability of the cathode material after being discharged out from the rotary kiln. The air outlet pipe is provided to discharge air which carries away dust, water vapor, and other emissions generated during a drying process of a cathode material.

The first fan has two functions: 1. The first fan can drive the flow of air in the rotary kiln, a cathode material is constantly thrown up and falls in the rotary kiln during which dust on the cathode material will pervade in the rotary kiln, and the flowing air can carry away the dust to reduce the dust adhesion on a surface of the cathode material. 2. The first fan can make an air flow direction opposite to a delivery direction of a cathode material to prevent dust from re-attaching to the cathode material.

According to the embodiment in the first aspect of this application, a plurality of heating units may be arranged in an axial direction of the rotary kiln, and the heating units may be provided to form a plurality of zones with different temperatures on the rotary kiln.

According to the embodiment in the first aspect of this application, a dust collector may be provided on the air outlet pipe.

According to the embodiment in the first aspect of this application, the exhaust system may further include a blowback assembly, and the blowback assembly may include a second fan, a main pipe, and a first pipeline; at least one first pipeline may be provided; one end of the first pipeline may communicate with the air outlet pipe, and the other end of the first pipeline may communicate with the main pipe; a control valve may be provided on the first pipeline; and the second fan may be arranged on the main pipe.

According to the embodiment in the first aspect of this application, the blowback assembly may further include a second pipeline; one end of the second pipeline may be connected to a dust collecting end of the dust collector, and the other end of the second pipeline may communicate with the main pipe; and a control valve may be provided on the second pipeline.

According to the embodiment in the first aspect of this application, at least one of the main pipe, the air inlet pipe, the air outlet pipe, the first pipeline, and the second pipeline may be provided with a gas heater.

According to an embodiment in a second aspect of this application, a cathode material drying production line is provided, including the cathode material drying device according to the embodiment in the first aspect.

Specifically, with the cathode material drying device of the above embodiment, the leakage probability of emissions is reduced and the production efficiency is improved in the cathode material drying production line of this embodiment.

According to the embodiment in the second aspect of this application, the cathode material drying production line may further include a feeding structure; the feeding structure may include a screw feeder and a feed box; and a feed end of the screw feeder may be connected to the feed box, and a discharge end of the screw feeder may communicate with the kiln head of the rotary kiln through the sealing structure.

According to the embodiment in the second aspect of this application, the feed box may be connected to the dust collector through a dust exhaust pipe, and the dust exhaust pipe may communicate with the main pipe through a third pipeline.

According to the embodiment in the second aspect of this application, the cathode material drying production line may further include a discharging structure; the discharging structure may include a discharge box and a double-roll crusher; and one end of the discharge box may communicate with the kiln tail of the rotary kiln through the sealing structure, and the other end of the discharge box may be connected to the double-roll crusher.

Additional aspects and advantages of this application will be partly provided in the following description, and partly become evident in the following description or understood through the practice of this application.

BRIEF DESCRIPTION OF THE DRAWINGS

The above and/or additional aspects and advantages of this application will become apparent and easy to understand from the description of the embodiments in conjunction with the following drawings.

Figure 1:
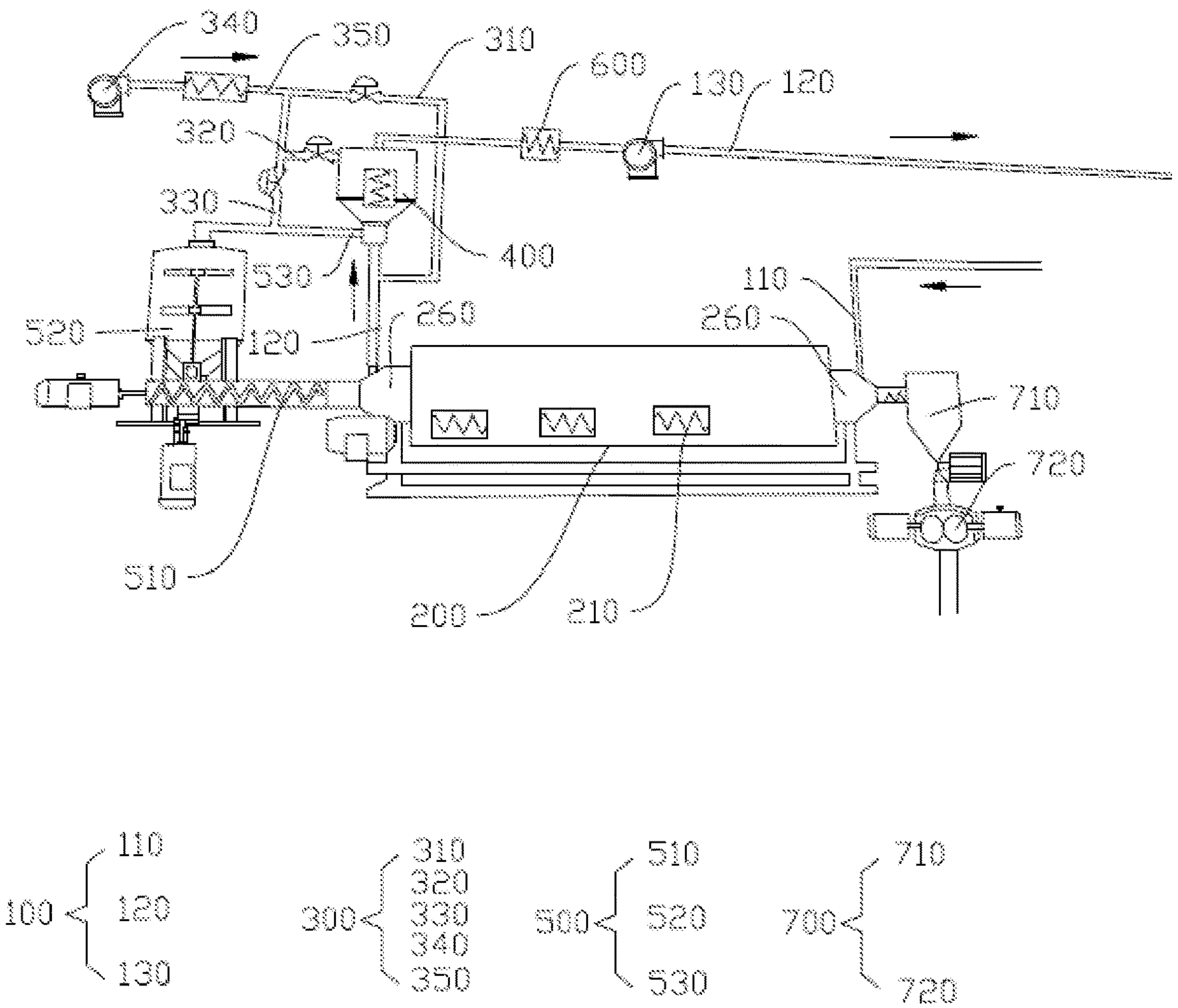
FIG. 1 is a schematic structural diagram of the cathode material drying production line according to the embodiment of the second aspect of this application.

Reference numerals: exhaust system: 100; air inlet pipe: 110; air outlet pipe: 120; first fan: 130; rotary kiln: 200; heating unit: 210; stuffing box: 220; gland: 230; end cover: 240; stuffing: 250; sealing structure: 260; blowback assembly: 300; first pipeline: 310; second pipeline: 320; third pipeline: 330; second fan: 340; main pipe: 350; dust collector: 400; feeding structure: 500; screw feeder: 510; feed box: 520; dust exhaust pipe: 530; gas heater: 600; discharging structure: 700; discharge box: 710; and double-roll crusher: 720.

DETAILED DESCRIPTION

The embodiments of this application are described below in detail. Examples of the embodiments are shown in the accompanying drawings. The same or similar numerals represent the same or similar elements or elements having the same or similar functions throughout the specification. The embodiments described below with reference to the accompanying drawings are exemplary, and are only used to explain this application but should not be construed as a limitation to this application.

In the description of this application, it should be understood that orientations or position relationships indicated by terms such as "central", "longitudinal", "transversal", "length", "width", "thickness", "upper", "lower", "front", "back", "left", "right", "vertical", "horizontal", "top", "bottom", "inner", "outer", "axial", "radial", "circumferential", "front side", and "backside" are orientations or position relationships shown based on the accompanying drawings, and these terms are merely intended to facilitate the description of this application or simplify the description, rather than to indicate or imply that the mentioned apparatus or components must have a particular orientation or be constructed and operated in a particular orientation. Therefore, these terms should not be construed as a limitation to this application. In addition, features defined with "first" and "second" may explicitly or implicitly include one or more of the features. In the description of this application, unless otherwise specified, "a plurality of" means two or more.

The cathode material drying device according to the embodiment of this application will be described below with reference to FIG. 1.

A cathode material drying device includes:

a rotary kiln 200, where a kiln head and a kiln tail of the rotary kiln 200 each are provided with a sealing structure 260 and the rotary kiln 200 can rotate relative to the sealing structure 260; and an exhaust system 100 including an air inlet pipe 110, an air outlet pipe 120, and a first fan 130, where the air inlet pipe 110 communicates with the kiln tail of the rotary kiln 200 through the sealing structure 260; the air outlet pipe 120 communicates with the kiln head of the rotary kiln 200 through the sealing structure 260; and the first fan 130 is arranged on the air inlet pipe 110 and/or the air outlet pipe 120, so as to make an air flow direction in the rotary kiln 200 opposite to a delivery direction of a cathode material.

Specifically, the rotary kiln 200 is provided to treat a cathode material. A cathode material can be continuously fed through the kiln head of the rotary kiln 200, dried in the rotary kiln 200, and then discharged out through the kiln tail. Compared with the traditional method, the cathode material drying device according to the embodiment in the first aspect of this application can continuously dry a cathode material with high efficiency. Moreover, a cathode material is constantly thrown up and falls in the rotary kiln 200 during a drying process, such that the cathode material is always in a motion state, which can prevent the cathode material from agglomeration compared with the traditional method. A sealing structure 260 is provided at each of the kiln head and the kiln tail of the rotary kiln 200 to improve the air tightness of the rotary kiln 200.

The air inlet pipe 110 communicates with the kiln tail of the rotary kiln 200, and can introduce fresh and clean compressed air and blow air to a cathode material at the kiln tail of the rotary kiln to remove residual particle dust and moisture on a surface of the cathode material, which reduces the agglomeration probability of the cathode material after being discharged out from the rotary kiln. The air outlet pipe 120 is provided to discharge an air which carries away dust, water vapor, and other emissions generated during a drying process of a cathode material.

It can be appreciated that an air cannon or an air bag may be also provided on the air outlet pipe 120, and the air cannon or air bag may be arranged at a position close to the kiln head of the rotary kiln 200.

The first fan 130 has two functions: 1. The first fan can drive the flow of air in the rotary kiln 200, a cathode material is constantly thrown up and falls in the rotary kiln 200 during which dust on the cathode material will pervade in the rotary kiln 200, and the flowing air can carry away the dust to reduce the dust adhesion on a surface of the cathode material.

2. The first fan can make an air flow direction opposite to a delivery direction of a cathode material to prevent dust from re-attaching to the cathode material.

Figure 2:
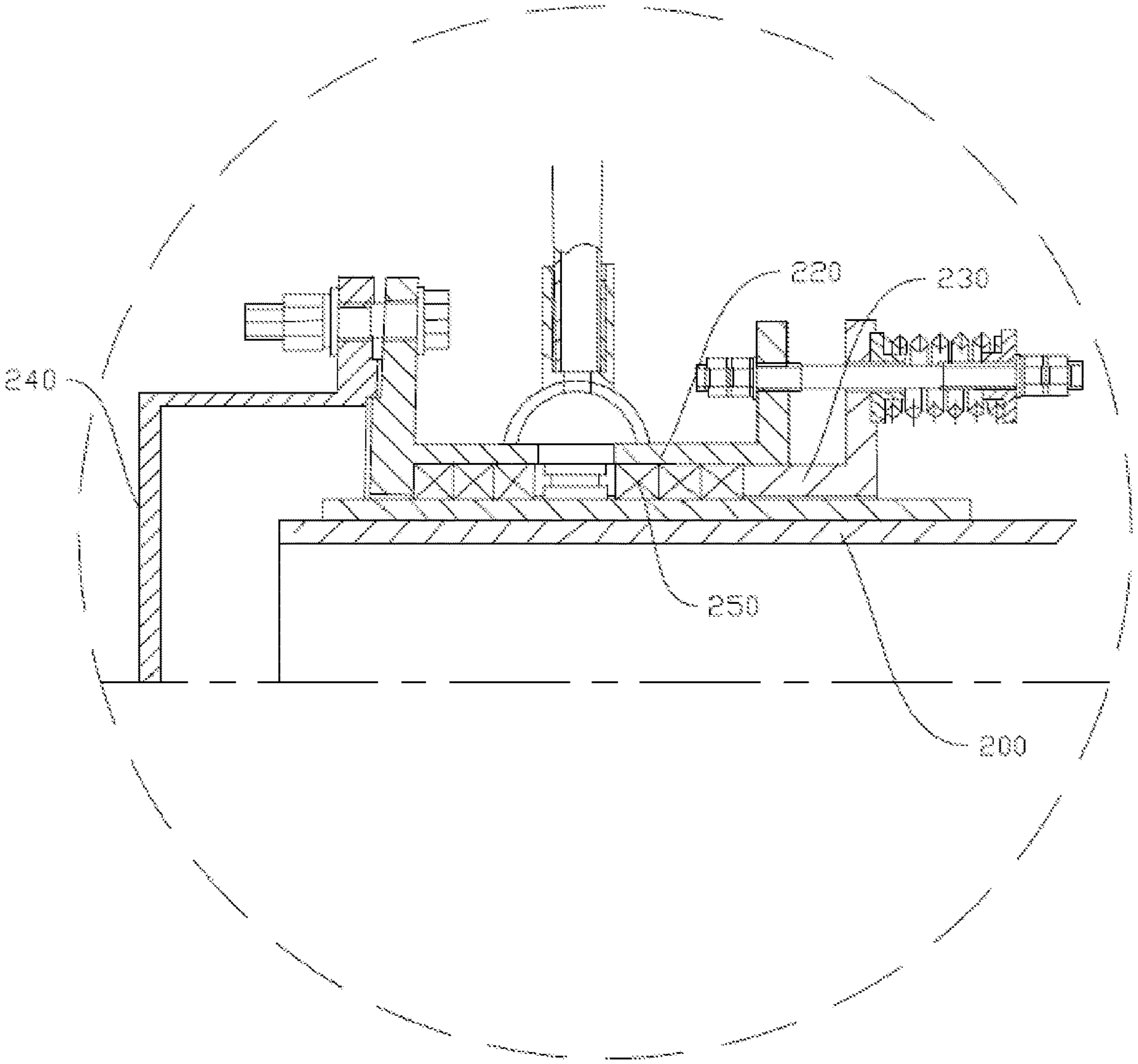
FIG. 2 is a schematic structural diagram of a cross section of the sealing structure shown in FIG. 1.

Specifically, the sealing structure 260 has a variety of different structural forms, and the sealing structure is described below with one of the structural forms as an example. As shown in FIG. 2, the sealing structure 260 includes a gland 230, a stuffing box 220, an end cover 240, and a stuffing 250, where the gland 230 and the stuffing box 220 constitute an airtight structure, and a receiving chamber is formed inside the airtight structure; the airtight structure is sleeved on the rotary kiln; the stuffing 250 is arranged in the receiving chamber and is in close contact with the rotary kiln to form a seal; and the end cover 240 is connected to the stuffing box 220 and covers the kiln head or tail zone of the rotary kiln. In this application, the feeding structure 500 can be connected to the end cover 240 to communicate with the kiln head; and the discharging structure 700 can also be connected to the end cover 240 to communicate with the kiln tail.

In some embodiments of this application, as shown in FIG. 1, a plurality of heating units 210 may be arranged in an axial direction of the rotary kiln 200, and the heating units 210 may be provided to form a plurality of zones with different temperatures on the rotary kiln 200.

Specifically, a plurality of heating units 210 are provided to form a plurality of zones with different temperatures on the rotary kiln 200, namely, temperature zones. The heating units 210 are arranged in an axial direction, such that the temperature zones are arranged in the axial direction of the rotary kiln 200 and a cathode material can pass through the temperature zones successively in the rotary kiln, thereby achieving the thorough drying of the cathode material.

More deeply, there are four temperature zones, which are a first temperature zone, a second temperature zone, a third temperature zone, and a fourth temperature zone along a direction from the kiln head to the kiln tail. The first temperature zone is at 120° C. to 150° C., the second temperature zone is at 150° C. to 180° C., the third temperature zone is at 180° C. to 200° C., and the fourth temperature zone is at room temperature.

A process of a cathode material passing through the first temperature zone to the third temperature zone is generally a temperature-rising process. However, in some cases, there is a large temperature difference between the first temperature zone and the second temperature zone and/or there is a large temperature difference between the second temperature zone and the third temperature zone. If a temperature-rising process of a cathode material is too violent, an internal structure of the cathode material may be damaged.

In this embodiment, the first fan 130 also has a third function: The first fan 130 makes an air flow direction in the rotary kiln 200 opposite to a delivery direction of a cathode material. Therefore, an air heated by the third temperature zone can be sent to a zone between the second temperature zone and the third temperature zone, such that a temperature transition between the third temperature zone and the second temperature zone tends to be smooth; and an air heated by the second temperature zone can be sent to a zone between the second temperature zone and the first temperature zone, such that a temperature transition between the second temperature zone and the first temperature zone tends to be smooth, which plays a role of protecting an internal structure of a cathode material. Moreover, with the first fan, the number of the heating units 210 can be reduced.

In some embodiments of this application, a dust collector 400 may be provided on the air outlet pipe 120.

Specifically, the dust collector 400 is provided to collect dust among emissions. Preferably, the dust collector 400 may be a bag dust collector.

In some embodiments of this application, as shown in FIG. 1, the exhaust system 100 may further include a blowback assembly 300, and the blowback assembly 300 may include a second fan 340, a main pipe 350, and a first pipeline 310; at least one first pipeline 310 may be provided; one end of the first pipeline 310 may communicate with the air outlet pipe 120, and the other end of the first pipeline may communicate with the main pipe 350; a control valve may be provided on the first pipeline 310; and the second fan 340 may be arranged on the main pipe 350.

Specifically, in long-term use, dust in the air outlet pipe 120 may accumulate to reduce a cross-sectional area of the air outlet pipe 120, thereby affecting the exhaust efficiency of the air outlet pipe 120. Therefore, the blowback assembly 300 can be provided to regularly or irregularly introduce a pulse air flow into the air outlet pipe 120 to remove accumulated dust or prevent dust accumulation.

Deeply, air is driven by the second fan 340 to form a pulse air flow, and the pulse air flow passes through the main pipe 350 and the first pipeline 310 successively and then enters the air outlet pipe 120 through the first pipeline 310; and a part of the pulse air flow entering the air outlet pipe 120 flows in an exhaust direction of the air outlet pipe 120 to clean accumulated dust in downstream of the first pipeline 310, and the remaining part flows against the exhaust direction of the air outlet pipe 120 to clean accumulated dust in upstream of the air outlet pipe 120.

More deeply, various different dust accumulations will be produced at many positions inside the air outlet pipe 120 when the air outlet pipe 120 is long, and the pulse air flow has a small action range. Therefore, a first pipeline 310 cannot comprehensively clean each of all dust accumulation positions, and the pulse air flow formed by a first pipeline 310 will generate an exhaust backpressure in the air outlet pipe 120, which is not conducive to the exhaust of the air outlet pipe 120. Therefore, when the air outlet pipe 120 is long, a plurality of first pipelines 310 may be provided to generate a pulse air flow everywhere in the air outlet pipe 120 to reduce the influence of exhaust backpressure.

In some embodiments of this application, as shown in FIG. 1, the blowback assembly 300 may further include a second pipeline 320; one end of the second pipeline 320 may be connected to a dust collecting end of the dust collector 400, and the other end of the second pipeline may communicate with the main pipe 350; and a control valve may be provided on the second pipeline 320.

Specifically, the second pipeline 320 may be provided to introduce a pulse air flow into a bag dust collector to clean a dust collecting end of the bag dust collector.

More specifically, when the dust collector 400 in the embodiment of this application is the bag dust collector in the above embodiment, one end of the second pipeline 320 is aligned with a bag body of the bag dust collector.

In some embodiments of this application, at least one of the main pipe 350, the air outlet pipe 120, the first pipeline 310, and the second pipeline 320 may be provided with a gas heater 600.

Specifically, water vapor in the air outlet pipe 120 may condense on an inner wall of the air outlet pipe 120 and adsorb dust to form agglomerates, which are difficult to clean. Therefore, in this embodiment, at least one of the main pipe 350, the air outlet pipe 120, the first pipeline 310, and the second pipeline 320 may be provided with a gas heater 600, which can heat a gas to prevent condensation of water vapor in the gas.

Preferably, the main pipe 350, the air outlet pipe 120, the first pipeline 310, and the second pipeline 320 may be all provided with a gas heater 600.

According to an embodiment in a second aspect of this application, a cathode material drying production line is provided, including the cathode material drying device according to the embodiment in the first aspect, as shown in FIG. 1.

Specifically, the cathode material drying device of the above embodiment can continuously dry a cathode material with high efficiency and can also prevent the leakage of emissions.

According to the embodiment in the second aspect of this application, the cathode material drying production line may further include a feeding structure 500; the feeding structure 500 may include a screw feeder 510 and a feed box 520; and a feed end of the screw feeder 510 may be connected to the feed box 520, and a discharge end of the screw feeder 510 may communicate with the kiln head of the rotary kiln 200 through the sealing structure 260.

Specifically, the feed box 520 is provided to store a cathode material and deliver the cathode material to the rotary kiln 200 through the screw feeder 510; and the screw feeder 510 has prominent sealing performance and can prevent the flow backward of a discharge.

According to the embodiment in the second aspect of this application, the feed box 520 may be connected to the dust collector 400 through a dust exhaust pipe 530, and the dust exhaust pipe 530 may communicate with the main pipe 350 through a third pipeline 330.

In different scenarios, the third pipeline 330 has different functions, which is described with two application scenarios as examples:

In some application scenarios, the feed box 520 is provided to store a cathode material, and under the action of the screw feeder 510, the cathode material in the feed box 520 will become less and less and cathode material particles will roll relative to each other, such that part of dust originally attached to a surface of the cathode material will be thrown up and pervade in the feed box 520. A dust exhaust pipe 530 connecting the feed box 520 and the dust collector 400 is provided, such that the dust collector 400 can adsorb dust in the feed box 520 to prevent the dust from re-attaching to the cathode material and reduce the dust carried by the cathode material entering the rotary kiln 200. A third pipeline 330 connecting the dust exhaust pipe 530 and the main pipe 350 is provided, which can introduce a pulse air flow into the dust exhaust pipe 530 to prevent dust from accumulating in the dust exhaust pipe 530 and blocking the dust exhaust pipe 530.

In other application scenarios, a feeding pipeline is also provided, and the feeding pipeline is connected to the feed box 520. The feeding pipeline continuously delivers a cathode material into the feed box 520. The feed box serves as a transfer station, and thus dust carried by the cathode material will continuously accumulate in the feed box 520. Therefore, the third pipeline 330 can be provided to remove a part of the dust accumulated in the feed box 520 to prevent excessive accumulation of dust in the feed box 520.

According to the embodiment in the second aspect of this application, the cathode material drying production line may further include a discharging structure 700; the discharging structure 700 may include a discharge box 710 and a double-roll crusher 720; and one end of the discharge box 710 may communicate with the kiln tail of the rotary kiln 200 through the sealing structure 260, and the other end of the discharge box may be connected to the double-roll crusher 720.

Specifically, the discharging structure 700 can be provided to receive a cathode material flowing out from the rotary kiln 200 and further deliver the cathode material to the next-level processing device. The discharging structure 710 is provided to temporarily store a cathode material, and the double-roll crusher 720 is provided to prevent a cathode material from re-agglomerating, which affects the subsequent processing. The cathode material drying production line of this application is described in detail below through a specific example, as shown in FIG. 1:

A cathode material drying production line includes:

a cathode material drying device, including: a rotary kiln 200, where a kiln head and a kiln tail of the rotary kiln 200 each are provided with a sealing structure 260 and the rotary kiln 200 can rotate relative to the sealing structure 260; and an exhaust system 100 including an air inlet pipe 110, an air outlet pipe 120, and a first fan 130, where the air inlet pipe 110 communicates with the kiln tail of the rotary kiln 200 through the sealing structure 260; the air outlet pipe 120 communicates with the kiln head of the rotary kiln 200 through the sealing structure 260; and the first fan 130 is arranged on the air inlet pipe 110 and/or the air outlet pipe 120, so as to make an air flow direction in the rotary kiln 200 opposite to a delivery direction of a cathode material;

heating units 210, where three heating units are arranged in an axial direction of the rotary kiln 200, and the heating units 210 are provided to form a plurality of zones with different temperatures on the rotary kiln 200;

a dust collector 400 provided on the air outlet pipe 120;

a blowback assembly 300, where the blowback assembly 300 includes a second fan 340, a main pipe 350, a second pipeline 320, and a first pipeline 310; one first pipeline 310 is provided; one end of the first pipeline 310 communicates with the air outlet pipe 120, and the other end of the first pipeline communicates with the main pipe 350; a control valve is provided on the first pipeline 310; the second fan 340 is arranged on the main pipe 350; one end of the second pipeline 320 is connected to a dust collecting end of the dust collector 400, and the other end of the second pipeline communicates with the main pipe 350; and a control valve is provided on the second pipeline 320;

gas heaters 600 provided on the main pipe 350, the air outlet pipe 120, the first pipeline 310, and the second pipeline 320; and a feeding structure 500, where the feeding structure 500 includes a screw feeder 510 and a feed box 520; a feed end of the screw feeder 510 is connected to the feed box 520, and a discharge end of the screw feeder 510 communicates with the kiln head of the rotary kiln 200 through the sealing structure 260; and the feed box 520 is connected to the dust collector 400 through a dust exhaust pipe 530, and the dust exhaust pipe 530 communicates with the main pipe 350 through a third pipeline 330.

The beneficial technical effects of this specific embodiment can be seen in all the above embodiments.

Although the embodiments of this application have been illustrated and described, a person of ordinary skill in the art can understand that various changes, modifications, replacements, and variants may be made to these embodiments without departing from the principle and purpose of this application, and the scope of this application is defined by the claims and equivalents thereof.

The invention claimed is:

1. A cathode material drying device, comprising:

a rotary kiln, wherein a kiln head and a kiln tail of the rotary kiln each are provided with a sealing structure and the rotary kiln can rotate relative to the sealing structure; and an exhaust system comprising an air inlet pipe, an air outlet pipe, and a first fan, wherein the air inlet pipe communicates with the kiln tail of the rotary kiln through the sealing structure; the air outlet pipe communicates with the kiln head of the rotary kiln through the sealing structure; and the first fan is arranged on the air inlet pipe and/or the air outlet pipe to make, an air flow direction in the rotary kiln opposite to a delivery direction of a cathode material when the rotary kiln is working; a dust collector is provided on the air outlet pipe;

four heating units are arranged in an axial direction of the rotary kiln, and the heating units are provided to form four temperature zones with different temperatures in the rotary kiln, which are a first temperature zone, a second temperature zone, a third temperature zone, and a fourth temperature zone along a direction from the kiln head to the kiln tail; a temperature in the first temperature zone ranges from 120° C. to 150° C., a temperature in the second temperature zone ranges from 150° C. to 180° C., a temperature in the third temperature zone ranges from 180° C. to 200° C., and a temperature in the fourth temperature zone is room temperature;

the exhaust system further comprises a blowback assembly, and the blowback assembly comprises a first pipeline, a second pipeline, a second fan, and a main pipe; at least one first pipeline is provided; one end of the first pipeline communicates with the air outlet pipe, and the other end of the first pipeline communicates with the main pipe; a control valve is provided on the first pipeline; and the second fan is arranged on the main pipe; one end of the second pipeline is connected to a dust collecting end of the dust collector, and the other end of the second pipeline communicates with the main pipe; and a control valve is provided on the second pipeline; at least one selected from the group consisting of the main pipe, the air outlet pipe, the air inlet pipe, the first pipeline, and the second pipeline is provided with a gas heater.

2. A cathode material drying production line, comprising the cathode material drying device according to claim 1.

3. The cathode material drying production line according to claim 2, further comprising a feeding structure, wherein the feeding structure comprises a screw feeder and a feed box; and a feed end of the screw feeder is connected to the feed box, and a discharge end of the screw feeder communicates with the kiln head of the rotary kiln through the sealing structure.

4. The cathode material drying production line according to claim 3, wherein the feed box is connected to the dust collector through a dust exhaust pipe, and the dust exhaust pipe communicates with the main pipe through a third pipeline.

5. The cathode material drying production line according to claim 2, further comprising a discharging structure, wherein the discharging structure comprises a discharge box and a double-roll crusher; and one end of the discharge box communicates with the kiln tail of the rotary kiln through the sealing structure, and the other end of the discharge box is connected to the double-roll crusher.

* * * * *